(12) United States Patent
Catley et al.

(10) Patent No.: US 6,856,678 B2
(45) Date of Patent: Feb. 15, 2005

(54) METHOD FOR UPDATING CALL REDIRECTION DESTINATIONS IN A COMMUNICATION NETWORK

(75) Inventors: Ian Catley, Puchheim (DE); Martin Gartner, Taufkirchen (DE); Hans-Peter Vow Ow, Munich (DE); Stefan Honold, Munich (DE); Burkhard Speitkamp, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 295 days.

(21) Appl. No.: 09/825,521

(22) Filed: Apr. 2, 2001

(65) Prior Publication Data

US 2002/0006189 A1 Jan. 17, 2002

(30) Foreign Application Priority Data

Mar. 31, 2000 (DE) ......................................... 100 16 245

(51) Int. Cl.[7] ............................................... H04M 3/42
(52) U.S. Cl. ............................. 379/211.02; 379/212.01; 379/214.01; 379/142.07; 379/225
(58) Field of Search ...................... 379/211.02, 212.01, 379/214.01, 142.07, 225, 157, 231–234

(56) References Cited

U.S. PATENT DOCUMENTS

| | | | | |
|---|---|---|---|---|
| 4,807,279 A | * | 2/1989 | McClure et al. | 379/211.02 |
| 4,873,717 A | * | 10/1989 | Davidson et al. | 379/157 |
| 5,012,511 A | * | 4/1991 | Hanle et al. | 379/201.05 |
| 5,206,901 A | * | 4/1993 | Harlow et al. | 379/211.04 |
| 5,729,599 A | * | 3/1998 | Plomondon et al. | 379/211.02 |
| 6,049,601 A | * | 4/2000 | Orui | 379/211.02 |
| 6,130,938 A | * | 10/2000 | Erb | 379/211.02 |
| 6,687,360 B2 | * | 2/2004 | Kung et al. | 379/211.02 |

* cited by examiner

*Primary Examiner*—Fan Tsang
*Assistant Examiner*—Simon Sing
(74) *Attorney, Agent, or Firm*—Bell Boyd & Lloyd LLC

(57) ABSTRACT

A method for updating call redirection destinations, in which a call redirection destination which has been changed by a user entry on a first subscriber terminal is stored for a second subscriber terminal, which forms a point of origin for a call redirection, in an associated memory together with the point of origin of the call redirection as call redirection information. The stored call redirection information is sent to a control unit associated with the second subscriber terminal. The control unit checks whether a call redirection indicated by the call redirection information has been set up. A call redirection is set up on the basis of the result of the check.

8 Claims, 1 Drawing Sheet

METHOD FOR UPDATING CALL REDIRECTION DESTINATIONS IN A COMMUNICATION NETWORK

BACKGROUND OF THE INVENTION

1. Field of the Invention

The present invention relates, generally, to a method for updating call redirection destinations in a communication network and, more particularly, to a method for cross-communication-system updating of call redirection destinations used for team functions in a communication network.

2. Description of the Prior Art

Setting up integrated executive-secretary systems makes team functions available in a private branch exchange. When an integrated executive-secretary system is set up, selected subscriber terminals are combined into an executive-secretary group, the role of the subscriber terminals is defined and the relationships between the individual subscriber terminals within the executive-secretary group is stipulated. The definable roles are manager, secretary and stand-in secretary. The relationships between the subscriber terminals within an executive-secretary group are stipulated by allocating a manager subscriber terminal to a secretary subscriber terminal, or a secretary subscriber terminal to a stand-in secretary subscriber terminal.

In the HICOM communication system from Siemens, a system-internal manager and secretary are available with a maximum of four manager telephones and a maximum of two secretary telephones per executive-secretary system (HICOM 300E V 2.0, description of service features, section 4.30 and section 6.3.1, 04.23.1999, Siemens reference number: P31003-G1036-1,100-3-18). In a standard operating mode, a call directed to a manager telephone is switched to a first secretary telephone and is signaled on the manager telephone and possibly on a further secretary telephone. The call can be accepted both from the manager telephone and from the further secretary telephone. After call redirection to the manager telephone, in a further operating mode, a call directed to the manager telephone is switched directly to the latter and is possibly signaled on the secretary telephones. The respective operating mode and the respective call redirection are signaled on the manager telephone and on the associated secretary telephones. To date, the team function for an executive-secretary system has been available only within a private branch exchange.

The present invention, therefore, is directed to a method for cross-communication-system updating of call redirection destinations used for team functions in a communication network.

SUMMARY OF THE INVENTION

Accordingly, pursuant to the method of the present invention, a call redirection destination which has been changed by a user entry on a first subscriber terminal is stored for a second subscriber terminal in an associated memory together with a point of origin of a call redirection as call redirection information. In this context, the second subscriber terminal forms the point of origin of the call redirection. As such, the user entry on the first subscriber terminal selects a new call redirection destination for the second subscriber terminal.

In addition, a memory associated with a subscriber terminal is a memory storing information associated with the subscriber terminal. The stored call redirection information is sent to a control unit associated with the second subscriber terminal as point of origin of the call redirection. The control unit does not have to be exclusively associated with the second subscriber terminal, but rather can perform corresponding functions for other subscriber terminals as well. The control unit checks whether a call redirection indicated by the call redirection information has already been set up, and a call redirection is set up on the basis of the result of the check.

One fundamental aspect of the method according to the present invention can be regarded as the dynamic updating of the call redirection information for the second subscriber terminal as point of origin of a call redirection. An updated call redirection destination can, thus, be always indicated on a manager telephone associated with the second subscriber terminal. In addition, a call redirection which has been set up to date can be reprogrammed from a secretary telephone associated with the first subscriber terminal via user entry, so that the first subscriber terminal becomes the new network-wide call redirection destination of a call redirection originating from the second subscriber terminal. This can be signaled on the manager telephone on the basis of the dynamically updated call redirection information. In addition, a network-wide stand-in destination can be determined for the first subscriber terminal from a secretary telephone, wherein the stand-in destination becomes the new call redirection destination for calls directed to the respective manager telephone.

In accordance with one preferred embodiment of the method according to the present invention, the call redirection information sent to the control unit is stored in a memory associated with the second subscriber terminal on the basis of the result of the check. By way of example, this allows the call redirection information to be indicated on a subscriber terminal associated with the second subscriber terminal.

In one further embodiment of the method according to the present invention, in a first operating mode, a call directed to the second subscriber terminal is switched to this subscriber terminal and is signaled for call acceptance on the first subscriber terminal. Preferably, in a second operating mode, a call directed to the second subscriber terminal is switched to a selected first subscriber terminal and is signaled for call acceptance on the second or on a further first subscriber terminal.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
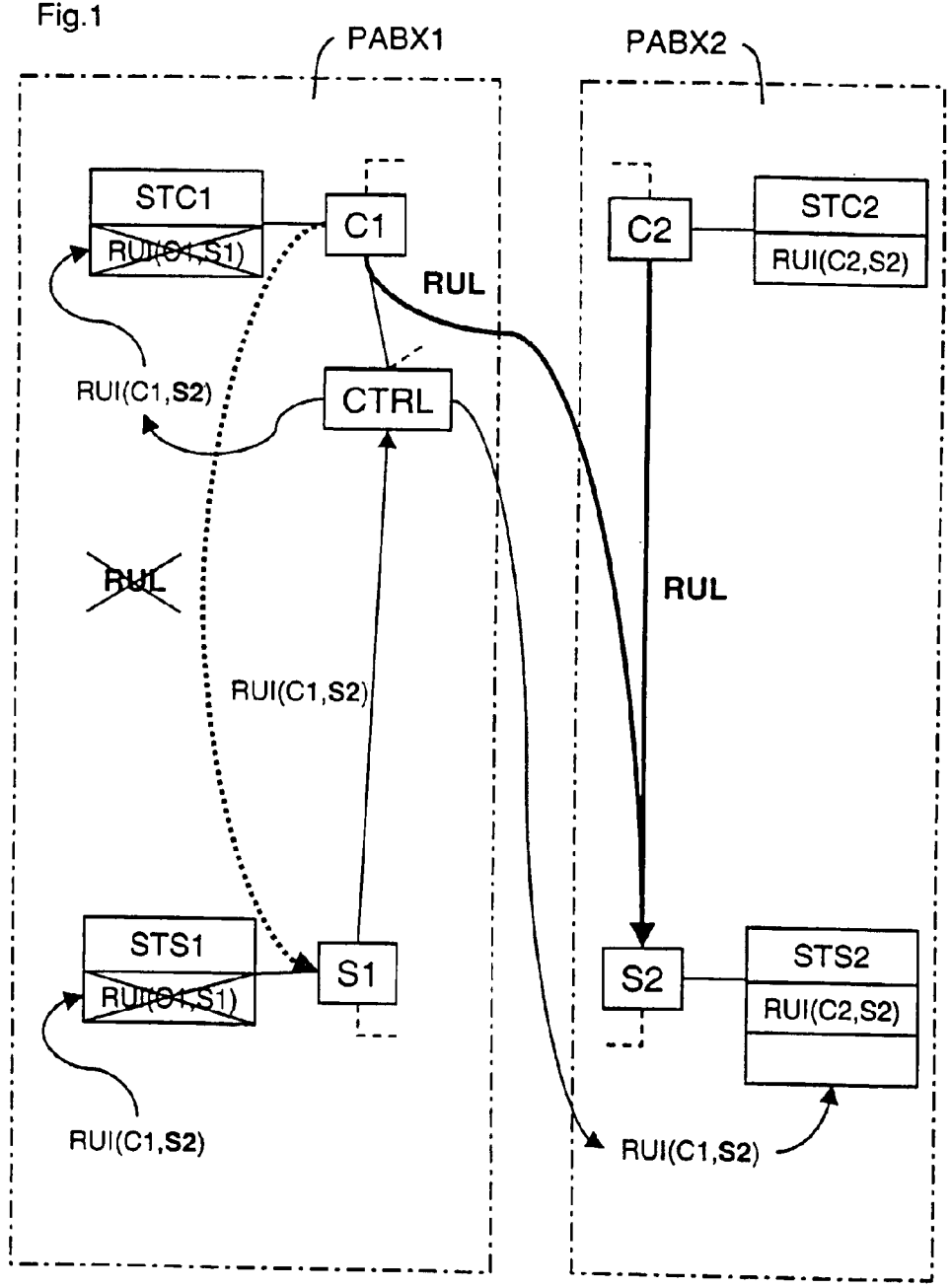
FIG. 1 shows a communication network having two communication systems and a number of first and second subscriber terminals related to one another.

FIG. 1 shows a communication network having two private branch exchanges PABX1, PABX2 and two first subscriber terminals S1, S2 and two second subscriber terminals C1, C2. The first subscriber terminals S1, S2 and the second subscriber terminals C1, C2 have a respective secretary and manager telephone (not shown in more detail) associated with them. The first subscriber terminals are called secretary terminals and the second subscriber terminals are called manager terminals below. The manager terminal C1 and the secretary terminal S1 are associated with the private branch exchange PABX1, while the manager terminal C2 and the secretary terminal S2 are associated with the private branch exchange PABX2.

In a first operating mode, a call directed to a manager terminal C1 or C2 is switched directly to the respective manager terminal and is signaled on the secretary terminals S1 and S2 for call acceptance within a network-wide call acceptance group. In a second operating mode, a call directed to a manager terminal C1 or C2 is switched to a selected secretary terminal S1 or S2 and is signaled for call acceptance on the relevant manager terminal C1 or C2 and on the unselected secretary terminal S1 or S2. Preferably, network-wide call acceptance groups need to be set up for this purpose. In this context, the manager terminal C1 and a respective virtual subscriber terminal for the secretary terminals S1 and S2 are associated with a first call acceptance group. The manager terminal C2 and a respective further virtual subscriber terminal for the secretary terminals S1 and S2 are associated with a second network-wide call acceptance group.

In an initial situation in the present example, call redirections RUL are set up from the manager terminal C1 to the secretary terminal S1 and from the manager terminal C2 to the secretary terminal S2. Memories STC1, STC2, STS1, STS2, respectively associated with a manager or secretary terminal C1, C2, S1, S2, store associated call redirection information RUI. The call redirection information contains a respective indication of a point of origin of a call redirection and a respective indication of a call redirection destination.

If the call redirection destination for the manager terminal C1 is changed to the secretary terminal S2, for example within the context of selecting a stand-in destination for the secretary terminal S1, updated call redirection information RUI (C1, S2) is stored in the memory STS1 associated with the secretary terminal S1. Alternatively, it is entirely possible for the updated call redirection information to be stored directly in the memory STS2 associated with the secretary terminal S2, or in a memory (not shown in more detail) for a number of subscriber terminals. Once the call redirection information RUI (C1, S2) has been stored in the memory STS1 for the secretary terminal S1, it is sent to a control unit CTRL associated with the manager terminal C1 as point of origin of the call redirection. The control unit CTRL also may be naturally associated with further subscriber terminals.

Connecting terminals emphasized in bold are used in FIG. 1 to show existing call redirections from manager terminals to secretary terminals. A dotted connecting terminal identifies a call redirection which has been cancelled. Updated call redirection information in a memory is illustrated by symbolized crossing-out of the respective previous call redirection information.

If a secretary terminal has been the call redirection destination for a number of manager terminals, then, in a stand-in operating mode, once a stand-in destination selected for the relevant secretary terminal has been entered, messages containing updated call redirection information are sent to control units for manager terminals which had previously been the point of origin of a call redirection to the aforementioned secretary terminal.

The control unit CTRL checks whether a call redirection indicated by the call redirection information RUI (C1, S2) already has been set up. On the basis of the result of the check, a call redirection is set up. In the present case, the call redirection information RUI (C1, S2) is used to set up a previously not yet existing call redirection RUL from the manager terminal C1 to the secretary terminal S2. Before a new call redirection is set up, a check should be carried out to determine whether the call redirection destination S2 indicated in the call redirection information RUI (C1, S2) exists and is in operation. Advantageously, the call redirection information RUI (C1, S2) checked in the control unit CTRL is stored in the memory STC1 associated with the manager terminal C1 after the associated call redirection has been set up. This permits visual or audible presentation of the updated call redirection information RUI (C1, S2) on a subscriber terminal associated with the manager terminal, for example on the display of said subscriber terminal.

By way of example, the call redirection information checked in the control unit also can be complemented by information about activation or deactivation of a call redirection. This permits a call redirection which already has been set up to be cancelled after a check in the control unit CTRL.

Once the updated call redirection information RUI (C1, S2) has been stored in the memory STC1 associated with the manager terminal C1, the updated call redirection information RUI (C1, S2) is sent to the secretary terminal S2, which presents the new call redirection destination. The call redirection information RUI (C1, S2) is preferably sent to the secretary terminal S2 within a call acceptance group with which the manager terminal C1 and the secretary terminals S1 and S2 are associated. Such a measure simplifies access monitoring, for example. The call redirection information RUI (C1, S2) sent to the secretary terminal S2 is complemented by an additional indication (not shown in more detail in FIG. 1) of activation or deactivation of a call redirection. In the present case, the call redirection information RUI (C1, S2) is complemented by an indication of the activation of the call redirection.

The memory STS2 associated with the secretary terminal S2 is searched for a comparison between call redirection information stored there and the call redirection information RUI (C1, S2) sent to secretary terminal S2. The call redirection information stored in the memory STS2 associated with the secretary terminal S2 is updated on the basis of the result of the comparison. In the present case, the call redirection information RUI (C1, S2) sent to the secretary terminal S2 is entered into the memory STS2. This permits, in particular, the updated call redirection information to be displayed on a subscriber terminal associated with the secretary terminal S2.

When the call redirection information stored in the memory STS2 associated with the secretary terminal S2 is compared with the call redirection information RUI (C1, S2) sent to the secretary terminal S2, the respective indications about point of origin of the call redirection are first checked for a match. If there is a match, the respective indications about the call redirection destination are checked.

If the indications about the call redirection destination match and the call redirection information RUI (C1, S2) sent indicates activation of a call redirection, the setup of a call redirection indicated by the call redirection information RUI (C1, S2) is displayed on a subscriber terminal associated with the secretary terminal S2. If the indications about the call redirection destination do not match, or the call redirection information RUI (C1, S2) sent indicates deactivation of a call redirection, the display for a call redirection from the respective manager terminal to the secretary terminal S2 is cleared on the associated subscriber terminal.

Although the present invention has been described with reference to specific embodiments, those of skill in the art will recognize that changes may be made thereto without departing from the spirit and scope of the invention as set forth in the hereafter appended claims.

We claim as our invention:

1. A method for updating call redirection destinations in a communication network, the method comprising the steps of:

storing, in a memory associated with a first subscriber terminal, both a call redirection destination, which has been changed by a user entry at the first subscriber terminal, and a point of origin of a call redirection as call redirection information for a second subscriber terminal which forms the point of origin of the call redirection;

sending the stored call redirection information to a control unit associated with the second subscriber terminal;

checking, via the control unit, whether a call redirection indicated by the call redirection information has been set up;

storing the call redirection information in a memory associated with the second subscriber terminal and setting up the call redirection based on a result of the step of checking; and operating the first subscriber terminal in a stand-in mode, wherein once a stand-in destination selected for the first subscriber terminal has been entered, messages containing updated call redirection information are sent to the second subscriber terminal which had previously been set up as the point of origin of the call redirection to the first subscriber terminal.

2. A method for updating call redirection destinations in a communication network as claimed in claim 1, the method further comprising the steps of:

checking, before the step of setting up the call redirection, whether the call redirection destination exists and is in operation; and storing the call redirection information in the memory associated with the second subscriber terminal based on a result of the step of checking.

3. A method for updating call redirection destinations in a communication network as claimed in claim 1, wherein a call directed to the second subscriber terminal within a call acceptance group, with which both the second subscriber terminal and at least one first subscriber terminal provided for a call redirection originating from the second subscriber terminal are associated, is at least one of forwarded and signaled to the first subscriber terminal.

4. A method for updating call redirection destinations in a communication network as claimed in claim 1, the method further comprising the step of:

signaling the call redirection information at least one of visually and audibly on the respective subscriber terminal.

5. A method for updating call redirection destinations in a communication network as claimed in claim 1, wherein, in a first operating mode, a call directed to the second subscriber terminal is switched to the second subscriber terminal and signaled for call acceptance on the first subscriber terminal.

6. A method for updating call redirection destinations in a communication network as claimed in claim 1, wherein, in a second operating mode, a call directed to the second subscriber terminal is switched to the first subscriber terminal and signaled for call acceptance on at least one of the second subscriber terminal and at least one further first subscriber terminal.

7. A method for updating call redirection destinations in a communication network, the method comprising the steps of:

storing, in a memory associated with a first subscriber terminal, both a call redirection destination, which has been changed by a user entry at the first subscriber terminal, and a point of origin of a call redirection as call redirection information for a second subscriber terminal which forms the point of origin of the call redirection;

sending the stored call redirection information to a control unit associated with the second subscriber terminal;

checking, via the control unit, whether a call redirection indicated by the call redirection information has been set up;

storing the call redirection information in a memory associated with the second subscriber terminal and setting up the call redirection based on a result of the step of checking;

sending messages containing the call redirection information to a further first subscriber terminal, wherein the call redirection information contained in the messages includes additional indications of one of activation and deactivation of a call redirection;

searching a respective memory associated with the further first subscriber terminal for a comparison between call redirection information stored in the respective memory and the call redirection information sent to the further first subscriber terminal contained in the messages; and updating the call redirection information stored in the respective memory associated with the further first subscriber terminal based on a result of the comparison.

8. A method for updating call redirection destinations in a communication network, the method comprising the steps of:

storing, in a memory associated with a first subscriber terminal, both a call redirection destination, which has been changed by a user entry at the first subscriber terminal, and a point of origin of a call redirection as call redirection information for a second subscriber terminal which forms the point of origin of the call redirection;

sending the stored call redirection information to a control unit associated with the second subscriber terminal;

checking, via the control unit, whether a call redirection indicated by the call redirection information has been set up;

storing the call redirection information in a memory associated with the second subscriber terminal and setting up the call redirection based on a result of the step of checking sending messages containing the call redirection information to a further first subscriber terminal, wherein the call redirection information contained in the messages includes additional indications of one of activation and deactivation of a call redirection;

searching a respective memory associated with the further first subscriber terminal for a comparison between call redirection information stored in the respective memory and the call redirection information sent to the further first subscriber terminal contained in the messages;

updating the call redirection information stored in the respective memory associated with the further first subscriber terminal based on a result of the comparison; and sending the messages containing the call redirection information, within a call acceptance group with which the further first subscriber terminal provided for a call redirection originating from the second subscriber terminal and the second subscriber terminal are associated, from the second subscriber terminal to the further first subscriber terminal.

* * * * *